United States Patent
Mao

(10) Patent No.: US 12,516,537 B2
(45) Date of Patent: Jan. 6, 2026

(54) POOL AUTOMATIC CLEANING DEVICE, AND CONTROL METHOD THEREOF

(71) Applicant: Shenzhen Aiper Intelligent Co., Ltd., Guangdong (CN)

(72) Inventor: Xuejiao Mao, Shenzhen (CN)

(73) Assignee: Shenzhen Aiper Intelligent Co., Ltd., Shenzhen (CN)

( * ) Notice: Subject to any disclaimer, the term of this patent is extended or adjusted under 35 U.S.C. 154(b) by 0 days.

(21) Appl. No.: 19/214,448

(22) Filed: May 21, 2025

(65) Prior Publication Data

US 2025/0283341 A1  Sep. 11, 2025

Related U.S. Application Data

(60) Provisional application No. 63/742,854, filed on Jan. 7, 2025.

(51) Int. Cl.
| | | |
|---|---|---|
| *E04H 4/16* | (2006.01) | |
| *G05D 1/49* | (2024.01) | |
| *G05D 1/628* | (2024.01) | |
| *G05D 105/10* | (2024.01) | |
| *G05D 107/00* | (2024.01) | |

(52) U.S. Cl.
CPC ............ *E04H 4/1654* (2013.01); *G05D 1/49* (2024.01); *G05D 1/628* (2024.01); *G05D 2105/10* (2024.01); *G05D 2107/29* (2024.01)

(58) Field of Classification Search
None
See application file for complete search history.

(56) References Cited

U.S. PATENT DOCUMENTS

| | | |
|---|---|---|
| 2,988,762 A | 6/1961 | Babcock |
| 4,749,478 A | 6/1988 | Brooks |
| | (Continued) | |

FOREIGN PATENT DOCUMENTS

| | | |
|---|---|---|
| AU | 2025202121 A1 | 4/2025 |
| AU | 202513477 S | 6/2025 |
| | (Continued) | |

OTHER PUBLICATIONS

Australian Examination Report issued on Jul. 4, 2025 for Australian Patent Application No. 2025203806.
(Continued)

*Primary Examiner* — Tamara L Weber
(74) *Attorney, Agent, or Firm* — VOLPE KOENIG

(57) ABSTRACT

The present application provides a pool automatic cleaning device, including: a main body; a moving mechanism which is located on a side of the main body and enables the pool automatic cleaning device to move; and a guiding structure which is disposed on the moving mechanism or the main body and protrudes from the moving mechanism or the main body; wherein during a movement of the pool automatic cleaning device, in a case where the guiding structure touches a pool wall, a friction force caused by the touch is able to cause the guiding structure to rotate. The present application may control the pool automatic cleaning device to keep the main body closely attached to the pool wall when moving along a pool edge through the guiding structure, thereby improving the mapping quality and the cleaning coverage rate in the pool edge region.

14 Claims, 3 Drawing Sheets

(56) References Cited

U.S. PATENT DOCUMENTS

| | | |
|---|---|---|
| 4,920,599 A | 5/1990 | Rief |
| 5,197,158 A | 3/1993 | Moini |
| 6,039,886 A | 3/2000 | Henkin et al. |
| 7,101,475 B1 | 9/2006 | Maaske et al. |
| 10,294,686 B1 | 5/2019 | Erlich et al. |
| 11,795,719 B1 | 10/2023 | Zhao et al. |
| 2003/0102014 A1 | 6/2003 | Yoshino |
| 2005/0279682 A1 | 12/2005 | Davidson et al. |
| 2014/0326652 A1* | 11/2014 | Garti .................. E04H 4/1654 210/241 |
| 2015/0259940 A1 | 9/2015 | Renaud et al. |
| 2016/0145884 A1* | 5/2016 | Erlich .................. E04H 4/1654 15/1.7 |
| 2019/0243379 A1* | 8/2019 | Attar .................. E04H 4/1654 |
| 2021/0197932 A1 | 7/2021 | Wu et al. |
| 2023/0212868 A1 | 7/2023 | Deng |
| 2024/0144125 A1 | 5/2024 | LaRose et al. |
| 2024/0337128 A1 | 10/2024 | Deng |
| 2025/0179826 A1 | 6/2025 | Wang |
| 2025/0207422 A1 | 6/2025 | Wei et al. |
| 2025/0208520 A1 | 6/2025 | Den Boef et al. |

FOREIGN PATENT DOCUMENTS

| | | |
|---|---|---|
| CN | 209837797 U | 12/2019 |
| CN | 212053969 U | 12/2020 |
| CN | 116161187 A | 5/2023 |
| CN | 116607827 A | 8/2023 |
| CN | 117071956 A | 11/2023 |
| CN | 117328716 A | 1/2024 |
| CN | 118327358 A | 7/2024 |
| CN | 308856457 S | 9/2024 |
| CN | 221810761 U | 10/2024 |
| CN | 222991236 U | 6/2025 |
| EP | 3205793 B1 | 9/2020 |
| WO | 1997001689 A1 | 1/1997 |
| WO | 2007015251 A2 | 2/2007 |
| WO | 2019058286 A1 | 3/2019 |
| WO | 2019209932 A1 | 10/2019 |
| WO | 2025113682 A1 | 6/2025 |

OTHER PUBLICATIONS

Australian Examination Report issued on Aug. 15, 2025 for Australian Patent Application No. 2025203806.

Australian Notification of Further Material Filed Under Section 27 issued on Sep. 5, 2025 for Australian Patent Application No. 2025203806.

Australian Examination report No. 3 for standard patent application issued on Sep. 15, 2025 for Australian Patent Application No. 307789.

Australian Notification of material filed by a third party issued on Jul. 28, 2025 for Australian Patent Application No. 2025203806.

Australian Notification of Material Filed Under Section 27 issued on Sep. 18, 2025 for Australian Patent Application No. 2025203806.

* cited by examiner

POOL AUTOMATIC CLEANING DEVICE, AND CONTROL METHOD THEREOF

CROSS-REFERENCE TO RELATED APPLICATION

This application claims priority to U.S. Provisional Application No. 63/742,854, filed on Jan. 7, 2025, the subject matter of which is hereby incorporated by reference in its entirety.

FIELD

The present application relates to the technical field of cleaning devices, and in particular, to a pool automatic cleaning device, and a control method thereof.

BACKGROUND

With the gradual promotion and application of swimming pools, swimming pool automatic cleaning robots have also been widely used for cleaning the bottom and walls of the swimming pool, greatly reducing the need and cost of manual cleaning. The swimming pool cleaning robot moves along a pool edge underwater or on the water surface, enabling mapping or cleaning the pool edge regions. When the swimming pool robot moves along the pool edge, the robot needs a distance measurement sensor to measure the distance between the robot body and the pool edge in real time, and the distance is controlled within a preset range in real time through a driving device, so as to achieve the function of moving along the pool edge. Due to a limited measurement range of the distance measurement sensor, the robots shall not be too far or too close to the pool edge. Moreover, the driving control has lag, in the process of the robot moving along the pool edge, the distance between the robot and a pool wall needs to be constantly adjusted, resulting in an uneven path when the robot moves along the pool edge, making it difficult to achieve a strictly parallel moving along the pool walls, which may lead to low mapping quality of the robot or problems of missed cleaning to the pool edge region.

SUMMARY

In one aspect of the present application, a pool automatic cleaning device is provided, including: a main body; a moving mechanism which is located on a side of the main body and enables the pool automatic cleaning device to move; and a guiding structure which is disposed on the moving mechanism or the main body and protrudes from the moving mechanism or the main body; where during a movement of the pool automatic cleaning device, in a case where the guiding structure touches a pool wall, a friction force caused by the touch is able to cause the guiding structure to rotate.

In another aspect of the present application, a method for controlling the pool automatic cleaning device to move along the pool wall is provided. The method includes: controlling the pool automatic cleaning device to move while in touch with the pool wall.

Compared with the prior art, the beneficial effects of the present application are: in the present application, by setting the guiding structure on the side of the moving mechanism or the side the main body of the pool automatic cleaning device, it can achieve that when robot is controlled to move along the pool edge, the robot can be closely attached to the pool wall by the touch between the guiding structure and the pool wall, and then, achieve that when the robot is moving along the pool edge, the machine body is always kept parallel to the pool wall, so that the moving path along the pool edge is smooth. The data collected by sensors on the robot, such as distance measurement sensors, lidars or visual sensors, can truly reflect the outline of the pool wall, improving the mapping quality of the pool automatic cleaning device and the cleaning coverage rate in the pool edge region. The guiding structure can also prevent the problem that during the movement of the robot, due to the too close distance between the robot and the pool wall, the machine body of the robot collides or rubs against the pool wall, enhancing the overall performance of the robot.

BRIEF DESCRIPTION OF THE DRAWINGS

The accompanying drawings that form a part of the present application are used to provide further understanding of the present application. The exemplary embodiments and descriptions of the present application are used to explain the present application and do not constitute an improper limitation of the present application. In the accompanying drawings.

Figure 1:
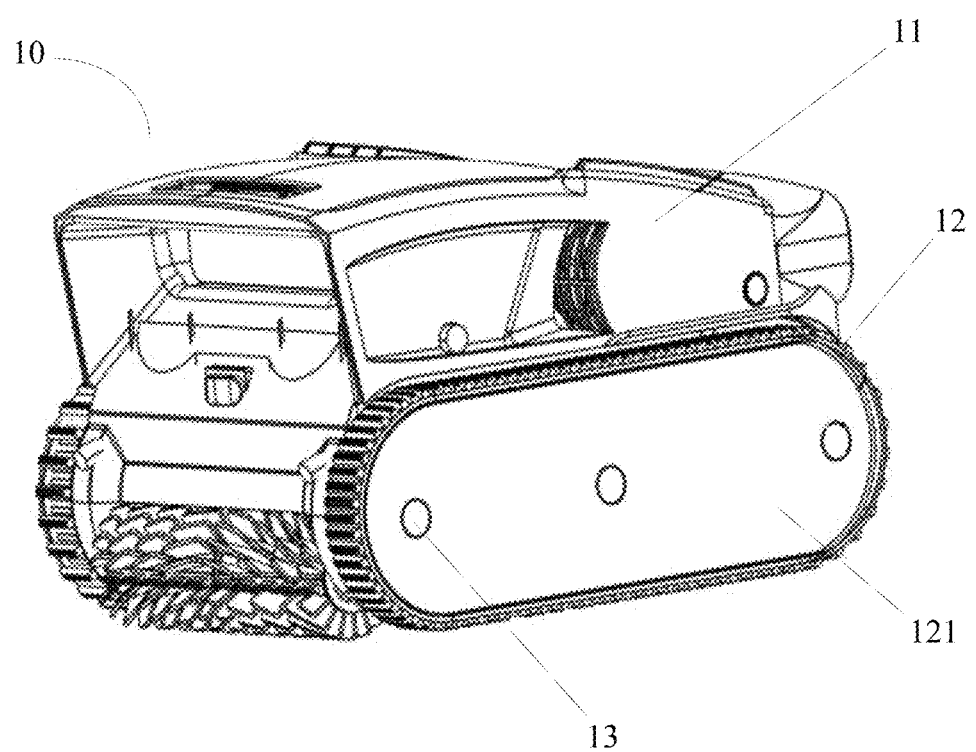
FIG. 1 schematically shows a structure of a pool automatic cleaning device in an embodiment of the present application.

The accompanying drawings described above include the following reference numerals: 10, pool automatic cleaning device; 11, main body; 12, moving mechanism; 121, track side plate; 122, track; 123, driving wheel; 124, driven wheel; 13, guiding structure.

DETAILED DESCRIPTION OF EMBODIMENTS

The technical solutions in the present application will be clearly and completely described below in combination with the accompanying drawings. Obviously, the embodiments described are only partial embodiments in the present application and not all embodiments. Based on the embodiments in the present application, all other embodiments obtained by persons skilled in the art without creative labor shall fall within the protection scope of the present application. It should be illustrated that the embodiments in the present application and the features in the embodiments may be combined with each other without contradicting each other.

The present application provides a pool automatic cleaning device, and the pool automatic cleaning device has at least one operation mode of a pool bottom cleaning mode, a pool wall cleaning mode, a water surface cleaning mode, and so on. It can be understood that the pool automatic cleaning device can clean the pool. The pool is, for example, a pool-shaped building. The pool-shaped building may be a swimming pool, a water storage pool, a hydrotherapy pool, a water storage tank, a water storage channel, and so on. The pool automatic cleaning device may be a device such as an automatic cleaning device, a pool cleaning robot, and so on, which can clean the pool-shaped building. The present application does not limit the specific presentation of the pool automatic cleaning device and the pool-shaped building, as long as the principle of the present application can be realized. Hereinafter, unless otherwise specified, a robot will be used as an example of the pool automatic cleaning device, and the swimming pool will be used as the pool or the pool-shaped building. Hereinafter, unless otherwise specified, the terms "a pool bottom", "a bottom surface of the swimming pool", and "a bottom of the swimming pool" refer to a surface of the pool bottom in the swimming pool; the terms "a pool wall" and "a surface of the pool wall" refer to a surface of the pool wall in the swimming pool.

Figure 2:
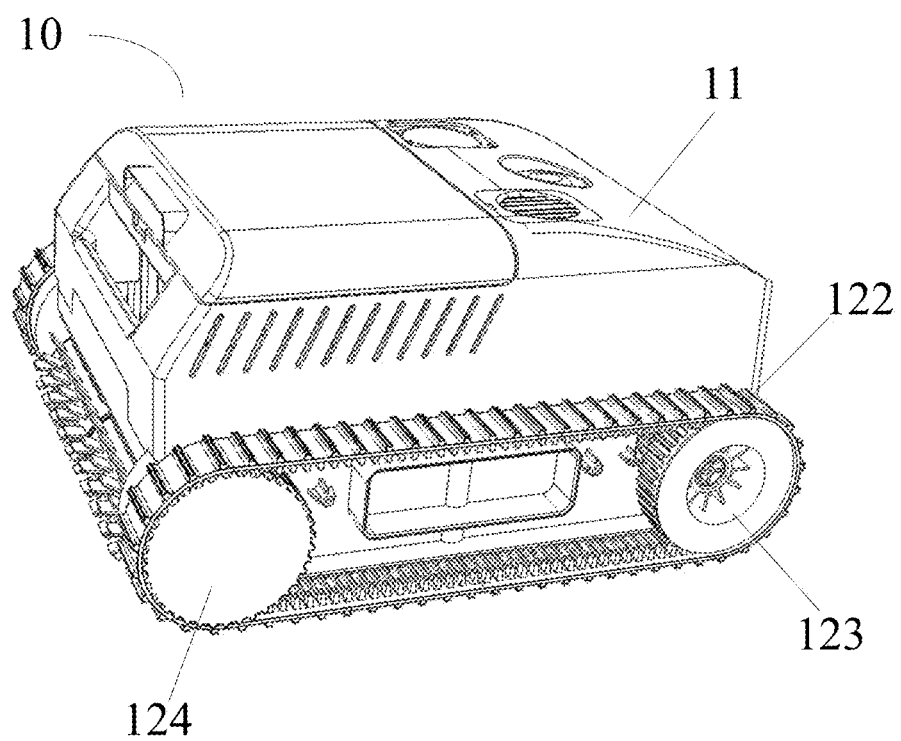
FIG. 2 schematically shows a structure of a pool automatic cleaning device in another embodiment of the present application.

A pool automatic cleaning device of the present application will be illustrated in detail below in combination with the accompanying drawings. FIG. 1 schematically shows an appearance of a pool automatic cleaning device in an embodiment of the present application. The pool automatic cleaning device may perform cleaning operations on the bottom, the wall and the water surface of the pool (such as a swimming pool) as needed, for example, to clean garbage in the water, the water bottom and the water surface, and clean the dirt on the bottom and wall of the pool. As shown in FIG. 1, the pool automatic cleaning device 10 may include a main body 11 and a moving mechanism 12. The moving mechanism 12 is located on a side of the main body 11, for example, the moving mechanism 12 may be disposed on both sides of the main body 11 to drive the pool automatic cleaning device 10 to move. During a movement of the pool automatic cleaning device 10, the moving mechanism 12 touches a supporting surface which supports the pool automatic cleaning device 10, which includes the bottom or wall of the pool. The pool automatic cleaning device 10 is driven to move through the friction force between the moving mechanism 12 and the supporting surface. Specifically, as shown in FIG. 2, the moving mechanism 12 may include a driving motor (not shown), a driving wheel 123, and a driven wheel 124. An output shaft of the driving motor may be connected to the driving wheel 123, and the driving wheel 123 is driven to rotate by the drive motor and the driving wheel 123 drives the driven wheel 124 to rotate, thereby driving the pool automatic cleaning device 10 to move. As shown in FIG. 1, the moving mechanism 12 also includes a track 122 and a track side plate 121. At least part of the track side plate 121 covers the driving wheel 123 and the driven wheel 124. The track 122 and the track side plate 121 wrap the driving wheel 123 and the driven wheel 124 to avoid the driving wheel 123 and the driven wheel 124 being tangled by external objects such as garbage and algae, and also to prevent dirt from entering the machine body.

As shown in FIG. 2, the driving wheel 123 is connected to the driven wheel 124 through the track 122, so that the driving wheel 123 can drive the driven wheel 124 to rotate through the track 122. Apart from the track 122, other methods such as chains or transmission gears may also be adopted to transfer the driving force of the driving wheel 123 to the driven wheel 124. It can rotate according to actual needs. The embodiments of the present application do not make specific limitations.

Furthermore, as shown in FIG. 1, in the embodiments of the present application, the pool automatic cleaning device 10 is also provided with a guiding structure 13. The guiding structure 13 may be disposed on the moving mechanism 12, for example, on the track side plate 121. The guiding structure 13 protrudes from an outermost side of the track side plate 121. Since the moving mechanism 12 of the pool automatic cleaning device 10 is often located outside the main body 11, the track side plate 121 is located at an outermost side of the machine body of the pool automatic cleaning device 10, and the guiding structure 13 protrudes from the track side plate 121, which means that when a side of the cleaning device touches the pool wall, the guiding structure 13 may touch the pool wall. Other structures on the cleaning device cannot touch the pool wall, thereby avoiding the wear or damage of other structures on the cleaning device.

In addition, the guiding structure 13 may also be disposed on the main body 11, such as on a side surface of the main body 11, and the guiding structure 13 protrudes from an outermost side of the side surface of the main body 11. For example, generally, an outermost side of the moving mechanism 12 is an outermost side of the machine body of the pool automatic cleaning device 10. The guiding structure 13 may be disposed on a side wall of the moving mechanism 12. If an outermost side of the moving mechanism 12 is not the outermost side of the machine body of the pool automatic cleaning device 10, the guiding structure 13 may be disposed on the main body 11, ensuring that the guiding structure 13 is located at the outermost side of the pool automatic cleaning device 10. The specific position of the guiding structure 13 on the robot may be disposed according to the actual situation.

Figure 3:
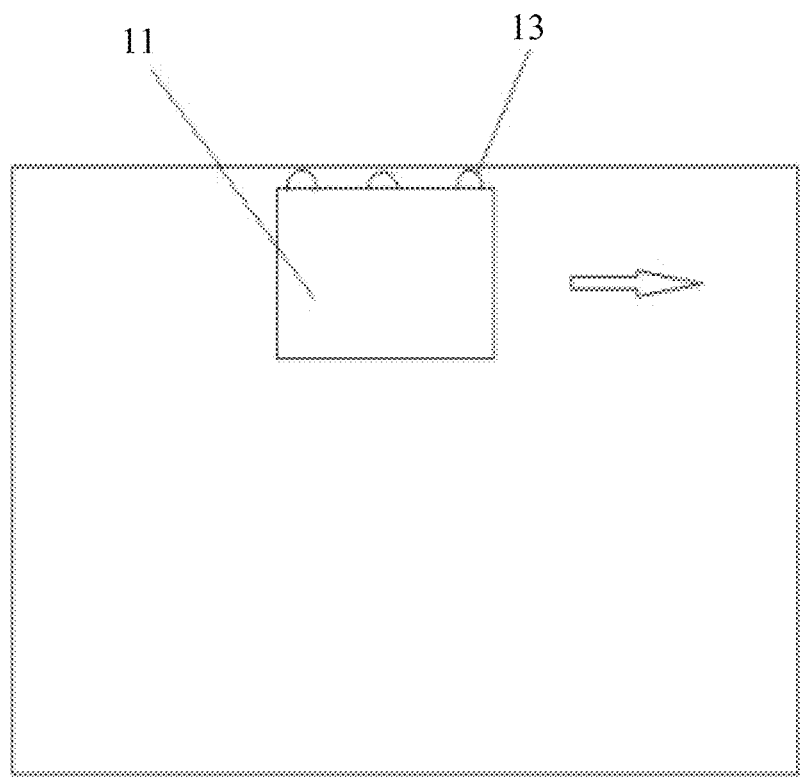
FIG. 3 schematically shows a scene of the pool automatic cleaning device moving along a pool edge of the present application.

As shown in FIG. 1, the track side plate 121 of the moving mechanism 12 is the outermost side of the pool automatic cleaning device 10. The guiding structure 13 is disposed on the track side plate 121 of the moving mechanism 12. The guiding structure 13 is a component that is closest to the pool wall relative to the machine body. When the pool automatic cleaning device 10 moves along the pool wall, a yaw angle of the cleaning device may be adjusted through the controller, so that the guiding structure 13 touches the pool wall, thereby ensuring that the machine body of the pool automatic cleaning device 10 is closely attached to the pool wall in the process of moving along the pool edge, and any part of the area to be cleaned will not be overlooked. If the guiding structure 13 does not touch the pool wall, there is a gap between the machine body and the pool wall, and the gap will become an uncleaned region. Moreover, by touching the pool wall, the guiding structure 13 can ensure that the moving path of the machine body of the cleaning device is consistent or close to an outline of the pool wall, thereby enabling the cleaning device to collect information closer to the real outline of the pool wall when collecting the outline of the pool wall for mapping. In addition, the guiding structure 13 protrudes from the outermost side of the machine body, and its touch with the pool wall can avoid the collision or friction between the machine body of the cleaning device or the sensors on the machine body and the pool wall, thereby protecting the machine body or the sensors. Finally, during the movement of the pool automatic cleaning device 10, if the guiding structure 13 touches the pool wall, the friction force caused by the touch can cause the guiding structure 13 to rotate. As shown in FIG. 3, when the robot moves in the direction indicated by the arrow, due to the friction force generated by the touch between the guiding structure 13 and the pool wall, the guiding structure 13 rotates along an direction opposite to the moving direction. Compared with the robot without the guiding structure 13, this rotatable guiding structure 13 brings lower friction or resistance when the robot collides or touches the pool wall and continues to move.

The guiding structure 13 may be disposed as a rolling structure, for example, the guiding structure 13 may include a roller, a ball or a deformable structure. Additionally, an outer side of the roller or ball can be wrapped with deformable materials (such as rubber, sponge, etc.) to prevent the pool wall from being damaged when the roller or ball, which are made of relatively hard materials, touches it. Of course, the guiding structure 13 may also be other rotatable or non-rotatable structures, such as: a smooth surface slider, etc., and a specific choice can be made to the guiding structure 13 according to actual needs.

There are a plurality of the guiding structures 13, and the plurality of the guiding structures may be disposed at intervals in the horizontal direction on the moving mechanism 12 or the main body 11. As shown in FIG. 1, there may be three guiding structures 13, and the guiding structures may be disposed, at intervals along a length direction of the pool automatic cleaning device, in the front, middle and rear parts of the track side plate 121. The interval distance may be determined according to the number of the guiding structure 13 and the structure and size of the robot. The heights of the plurality of the guiding structures 13 in the vertical direction may be the same or different. For example, as shown in FIG. 1, the vertical heights of three guiding structures 13 on the track side plate 121 are the same or nearly the same. Of course, according to the needs, two guiding structures 13 may be disposed respectively at the head and tail of the moving mechanism 12 or the main body 11 to ensure that the machine body is parallel to the pool wall when the pool automatic cleaning device moves along the pool edge. Alternatively, more guiding structures 13 may be disposed, so that multiple guiding structures 13 may ensure that a length direction of the machine body will not collide or touch the pool wall when the pool automatic cleaning device moves along the pool edge. Of course, if there are other needs or structures, e.g., the pool automatic cleaning device moves along the pool edge while maintaining an inclined posture to enable the rolling brush or the head suction port of the robot to better clean the pool wall or water line region, in this scenario, one guiding structure 13 may be disposed, e.g., the guiding structure 13 is disposed at the head or tail of the moving mechanism 12, thereby ensuring that the part of the machine body, which is close to the pool wall, does not collide or rub against the pool wall.

In addition, the protruding extents or the protruding dimensions where the multiple guiding structures 13 respectively protrude from the moving mechanism 12 or the main body 11 may be the same or not. In the case where the protruding extents or the protruding dimensions where the multiple guiding structures 13 respectively protrude from the moving mechanism 12 or the main body 11 are not the same, e.g., the protruding extents or the protruding dimensions of the guiding structure 13 decrease successively from the head to the tail of the cleaning device, when the machine body is in touch with the pool wall while the cleaning device moves along the pool edge, the machine body may tilt slightly, so that the rolling brush or the head suction port of the cleaning device may better clean the pool wall or water line region.

The guiding structure 13 may also include a structure for cleaning the pool wall, such as a bristle or a scraping blade. If the guiding structure 13 includes the bristle or the scraping blade, while the guiding structure touches the pool wall during the forward movement of the machine body, the guiding structure 13 may rotate or remain stationary, so as to clean the pool wall during the movement along the pool edge.

In addition, the pool automatic cleaning device 10 may also include a detection component, the detection component can detect whether the guiding structure 13 is in touch with the pool wall or not, so as to be able to control the guiding structure 13 to remain in touch with the pool wall when the robot moves along the pool edge. The detection component may be a touch sensor located on the guiding structure 13 or connected to the guiding structure 13, e.g., a pressure sensor, which can directly detect the pressure of the guiding structure 13 on the pool wall, thereby determining whether the guiding structure 13 is in touch with the pool wall. The detection component may also include a distance measurement sensor (such as an ultrasonic sensor, an infrared sensor, a TOF sensor, etc.), a lidar, a camera (such as a monocular camera or a binocular camera, etc.), or IMU (Inertial Measurement Unit) on the robot. Among them, the distance measurement sensor, the lidar, and the image sensor may determine whether the guiding structure 13 has detached from the pool wall by detecting the distance between the machine body and the pool wall. IMU may determine whether the guiding structure 13 has detached from the pool wall or not by detecting the posture change of the robot when it moves along the pool edge. For example, if the distance measurement sensor, the lidar or the image sensor detects an abnormal distance value between the machine body and the pool wall (such as the distance between the machine body and the pool wall exceeding the range of the distance measurement sensor, resulting in the inability to detect the distance value), or if the distance value exceeds the preset distance threshold (the preset distance threshold is greater than or equal to the length value by which the guiding structure 13 protrudes from the machine body), then it is determined that the guiding structure 13 has detached from the pool wall; or if the yaw angle change detected by the IMU exceeds the preset angle threshold within a predetermined time or a predetermined distance, then it is considered that the guiding structure 13 has detached from the pool wall.

The pool automatic cleaning device 10 also includes a controller. In the mode of the robot moving along the pool edge, if the detection component detects that the guiding structure 13 has detached from the pool wall (i.e., the guiding structure 13 does not touch the pool wall), the controller may adjust the yaw angle of the pool automatic cleaning device 10 by controlling the differential movement of the tracks 122 on both sides of the robot or by the water spraying mechanisms on the left and right sides of the robot, so that the guiding structure 13 returns to the state of touching the pool wall. The controller may be of any form as long as it can control the tracks 122 or the water spraying mechanisms. Additionally, the controller can also control the tracks 122 or the water spraying mechanism during the movement of the cleaning device along the pool wall to make a part of the guiding structures 13 touch the pool wall. At this time, the machine body maintains an inclined posture relative to the pool wall, so that the rolling brush or the head suction port of the robot can better clean the pool wall or the water line region. It should be noted that since the purpose of adjusting the yaw angle of the cleaning device is to make the guiding structure 13 touch the pool wall again, when adjusting the yaw angle, the cleaning device rotates towards the pool wall.

Furthermore, based on the pool automatic cleaning device 10 recorded in the above-mentioned embodiments, the embodiments of the present application may also provide a method for controlling the pool automatic cleaning device. The method can control the pool automatic cleaning device 10 to move while in touch with the pool wall when the cleaning device 10 is moving along the pool edge. For example, the guiding structure 13 touches the pool wall, so that the pool automatic cleaning device 10 may always remain parallel to the pool wall when moving along the pool edge.

Specifically, when the robot is moving along the pool edge, if the detection component detects that the pool automatic cleaning device 10 has detached from the pool wall, e.g., the guiding structure 13 has detached from the pool wall, the yaw angle of the pool automatic cleaning device 10 is adjusted to make the pool automatic cleaning device 10 touch the pool wall again.

In addition, during the movement of the robot in the pool, the environmental information where the robot is located, such as an outline of the surrounding pool wall, may be detected through a perception sensor disposed on the robot, such as the lidar, the distance measurement sensor, the image sensor, and so on, thereby determining whether the robot has reached the areas where missed cleaning is easy to happen, such as the corners of the pool, the curved areas of the pool wall, or the slope areas of the pool wall. If so, the pool automatic cleaning device 10 may be controlled to touch the pool wall, e.g., the guiding structure 13 touches the pool wall. In this way, the robot is closely attached to the pool wall, so as to clean the edges of the pool in these areas. By controlling the robot to touch the pool wall, the cleaning coverage rate in these areas can be improved.

In the description of the present specification, the reference terms "an embodiment", "some embodiments", "examples", "specific examples", or "some examples", etc., refer to that the specific features, structures, materials, or characteristics described in combination with this embodiment or example are included in at least one embodiment or example of the present application. Further, the specific features, structures, materials or characteristics described may be combined in a suitable manner in any one or more of embodiments or examples. In addition, without contradicting each other, persons skilled in the art may combine and assemble the different embodiments or examples and the features of different embodiments or examples described in the present specification.

Moreover, the terms "first" and "second" are only used to described purposes and are not to be understood as indicating or implying relative importance or as implicitly indicating the quantity of technical features indicated. In view of this, a feature defined as "first" or "second" may explicitly or implicitly include at least one feature. In the description of the present application, "multiple" means two or more, unless otherwise expressly and specifically defined.

In the present application, without the opposite explanation, the used positional words such as "up and down" are in terms of the directions shown in the accompanying drawings, or the vertical, perpendicular or gravitational directions; similarly, for the convenience of understanding and description, "left and right" usually refers to the left and right shown in the accompanying drawings; "inside and outside" refers to the inside and outside relative to the outline of each part itself. However, the positional words above described are not used to limit the present application.

The above displays and describes the basic principle, main features and beneficial effects of the present application. It should be understood by persons skilled in the art that the present application is not limited by the above-mentioned embodiments. The above-mentioned embodiments and the descriptions therein merely represent preferred examples of the present application and are not intended to limit the present application. Without departing from the spirit and scope of the present application, various changes and improvements can be made to the present application, and all such changes and improvements fall within the protection scope of the present application as claimed. The protection scope of the present application is defined by the claims and their equivalents.

I claim:

1. A pool automatic cleaning device, comprising:
    a main body;
    at least one moving mechanism which is located on a side of the main body and configured to enable the pool automatic cleaning device to move, and the moving mechanism comprises a track and a track side plate; and
    two rollers which are disposed on the track side plate and protrude from the track side plate;
    wherein the two rollers are respectively disposed in the front and rear parts of the track side plate;
    wherein during a movement along a pool edge of the pool automatic cleaning device, in a case where at least one of the two rollers touches a pool wall, a friction force caused by the touch causes the roller to rotate along a direction opposite to the moving direction,
    wherein the moving mechanism further comprises a driving motor, a driving wheel, and a driven wheel, the driving motor is connected to the driving wheel in a transmission manner, and at least a part of the track side plate covers a region between the driving wheel and the driven wheel,
    wherein the moving mechanism further comprises a transmission gear, and the driving wheel transmits a driving force to the driven wheel through the track or the transmission gear.

2. The pool automatic cleaning device according to claim 1, further comprising: a detection component which is used to detect whether one of the rollers touch the pool wall or not,
    wherein the detection component comprises a touch sensor, a distance sensor, a lidar, a camera, or an inertial measurement unit.

3. The pool automatic cleaning device according to claim 2, further comprising: a controller, wherein
    in a case where the detection component detects that the roller does not touch the pool wall, the controller adjusts a yaw angle of the pool automatic cleaning device, so that the roller touches the pool wall.

4. The pool automatic cleaning device according to claim 3, wherein in a case where the roller touches the pool wall, the pool automatic cleaning device maintains an inclined state relative to the pool wall.

5. The pool automatic cleaning device according to claim 4, wherein the controller adjusts the yaw angle by adjusting moving mechanisms on both sides of the pool automatic cleaning device.

6. The method pool automatic cleaning device according to claim 4, wherein the controller is configured to further control the pool automatic cleaning device to move parallel to the pool wall at the water bottom or on the water surface.

7. The pool automatic cleaning device according to claim 3, wherein the controller adjusts the yaw angle by adjusting moving mechanisms on both sides of the pool automatic cleaning device.

8. The pool automatic cleaning device according to claim 1, wherein the pool automatic cleaning device further comprises a third roller, and the third roller is located between the two rollers, and these three rollers are disposed at intervals from each other in the horizontal direction.

9. The pool automatic cleaning device according to claim 8, wherein the two rollers have different protruding extents or dimensions, and a dimension of the third roller is different from dimensions of the two rollers.

10. A pool automatic cleaning device, comprising:
a main body;
at least one moving mechanism which is located on a side of the main body and configured to enable the pool automatic cleaning device to move; and
at least one guiding structure which is disposed on the moving mechanism and protrudes from the moving mechanism;
wherein during a movement of the pool automatic cleaning device, in a case where the guiding structure touches a pool wall, a friction force caused by the touch causes the guiding structure to rotate along a direction opposite to the moving direction.

11. The pool automatic cleaning device according to claim 10, wherein the moving mechanism comprises a track and a track side plate.

12. The pool automatic cleaning device according to claim 10, wherein there are two guiding structures, and the two guiding structures are disposed in the front and rear parts of the moving mechanism.

13. The pool automatic cleaning device according to claim 12, wherein the movement of the pool automatic cleaning device comprises a movement of the pool automatic cleaning device along the pool edge, and the guiding structure comprises a roller.

14. A method for controlling the pool automatic cleaning device according to claim 13, wherein the method comprises: controlling the pool automatic cleaning device to move along the pool edge while at least one roller is in touch with the pool wall.

* * * * *